United States Patent [19]
Voigt et al.

[11] Patent Number: 5,195,601
[45] Date of Patent: Mar. 23, 1993

[54] INDEPENDENT REAR WHEEL TOE-IN CONTROL IN A VEHICLE FOUR WHEEL STEERING SYSTEM

[75] Inventors: Ronald W. Voigt, Essexville; Jeffrey A. Zuraski, Saginaw; Brian P. McDonald, Saginaw; James W. Babineau, Saginaw; Scott D. Morrison, Rochester, all of Mich.

[73] Assignee: General Motors Corporation, Detroit, Mich.

[21] Appl. No.: 694,296

[22] Filed: May 2, 1991

[51] Int. Cl.$^5$ ............................................. B62D 5/04
[52] U.S. Cl. .................................. 180/79.1; 180/140
[58] Field of Search ................. 180/79.1, 140; 280/91, 280/661

[56] References Cited

U.S. PATENT DOCUMENTS

| | | | |
|---|---|---|---|
| 4,768,603 | 9/1988 | Sugiyama et al. | 180/140 |
| 4,976,328 | 12/1990 | Ohmura | 180/140 |
| 5,067,577 | 11/1991 | Morishita | 180/79.1 |

Primary Examiner—Russell D. Stormer
Assistant Examiner—Florian Zeender
Attorney, Agent, or Firm—Mark A. Navarre

[57] ABSTRACT

The rear wheels of a motor vehicle are independently steered in an inward (toe-in) direction to improve yaw stability and on-center response. In moderate-to severe turning maneuvers, the rear wheel on the outside of the turn is controlled. In low-to-moderate turning maneuvers, the rear wheel on the inside of the turn is controlled.

3 Claims, 5 Drawing Sheets

INDEPENDENT REAR WHEEL TOE-IN CONTROL IN A VEHICLE FOUR WHEEL STEERING SYSTEM

This invention is directed to steering the rear wheels of a four wheel steer motor vehicle, and more particularly, to a control method in which the toe-in angle of each rear wheel is independently controlled.

BACKGROUND OF THE INVENTION

Various four wheel vehicle steering systems have been proposed for the dual purpose of improving the vehicle stability and maneuverability during turning maneuvers, and improving the on-center responsiveness, as compared to a two wheel steering system. The stability improvement, achieved by steering both rear wheels at a relatively small angle in-phase with the front wheels, is implemented primarily at moderate-to-high vehicle speeds. The on-center response improvement, achieved by steering both rear wheels at a relatively small angle out-of-phase with the front wheels, is also implemented primarily at moderate-to-high vehicle speeds. The maneuverability improvement, achieved by steering both rear wheels at a relatively large angle out-of-phase with the front wheels, is implemented primarily at low vehicle speeds.

Since the above-described controls steer both rear wheels in unison, the rear wheels each experience toe-in and toe-out steering movements. The toe angle is defined as the steering angle of the wheel relative to the longitudinal or roll axis of the vehicle. Toe-in refers to a toe angle which points the wheel toward the forward longitudinal axis of the vehicle, and toe-out refers to a toe angle which points the wheel away from the forward longitudinal axis.

The above-described characteristic of conventional rear wheel steering systems causes several problems. Perhaps most importantly, the vehicle must be designed to accommodate relatively large peak-to-peak movement of the rear wheels. This, of course, impacts styling, tire and wheel selection, trunk capacity, etc. Furthermore, special toe angle alignment procedures and equipment must be used. Also, failure analysis and detection becomes very complicated, especially if electrical actuators are employed.

SUMMARY OF THE PRESENT INVENTION

The present invention is directed to an improved steering system which achieves the moderate-to-high speed advantages of conventional four wheel steering systems through independent toe-in control of each rear wheel.

In the basic configuration, the control improves vehicle yaw stability in moderate-to-high speed turning maneuvers through toe-in control of the rear wheel on the outside of the turn. As the vehicle enters the turn and begins to roll about its longitudinal axis, the normal force on the rear wheels shifts toward the outside of the turn. This increases the lateral force produced by the outside rear wheel while decreasing the lateral force produced by the inside rear wheel, thereby producing a progressively increasing rear cornering force in the same direction (in-phase) as the front wheel cornering force. In the illustrated embodiment, further improvements in on-center response and yaw initiation are achieved through toe-in control of the rear wheel on the inside of the turn.

Many of the disadvantages of conventional four wheel steering systems are inherently overcome with the above-described system. For example, vehicle packaging concerns are simplified since the rear wheels are never steered in a toe-out direction. Alignment procedures are similarly simplified through the provision of an adjustable mechanical stop at the point of zero steering angle. On a system level, actuator travel requirements are reduced and failure mode concerns associated with unintentional toe-out steering are eliminated. As an additional advantage, the peak and steady-state power requirements are reduced since in most maneuvers only one rear wheel is steered at any point in time.

BRIEF DESCRIPTION OF THE DRAWINGS

FIG. 2a schematically depicts the control on an outline drawing of a vehicle, and FIG. 2b graphically depicts the outside rear steering angle as a function of front wheel steering angle and vehicle speed.

FIG. 3a schematically depicts the control on an outline drawing of a vehicle, and FIG. 3b graphically depicts the inside rear steering angle as a function of front wheel steering angle and vehicle speed.

FIG. 5a is a partial cross section of the actuator, and FIG. 5b graphically depicts a motor current command for the actuator as a function of the desired inside or outside rear steering angle.

DETAILED DESCRIPTION OF THE INVENTION

Figure 1:
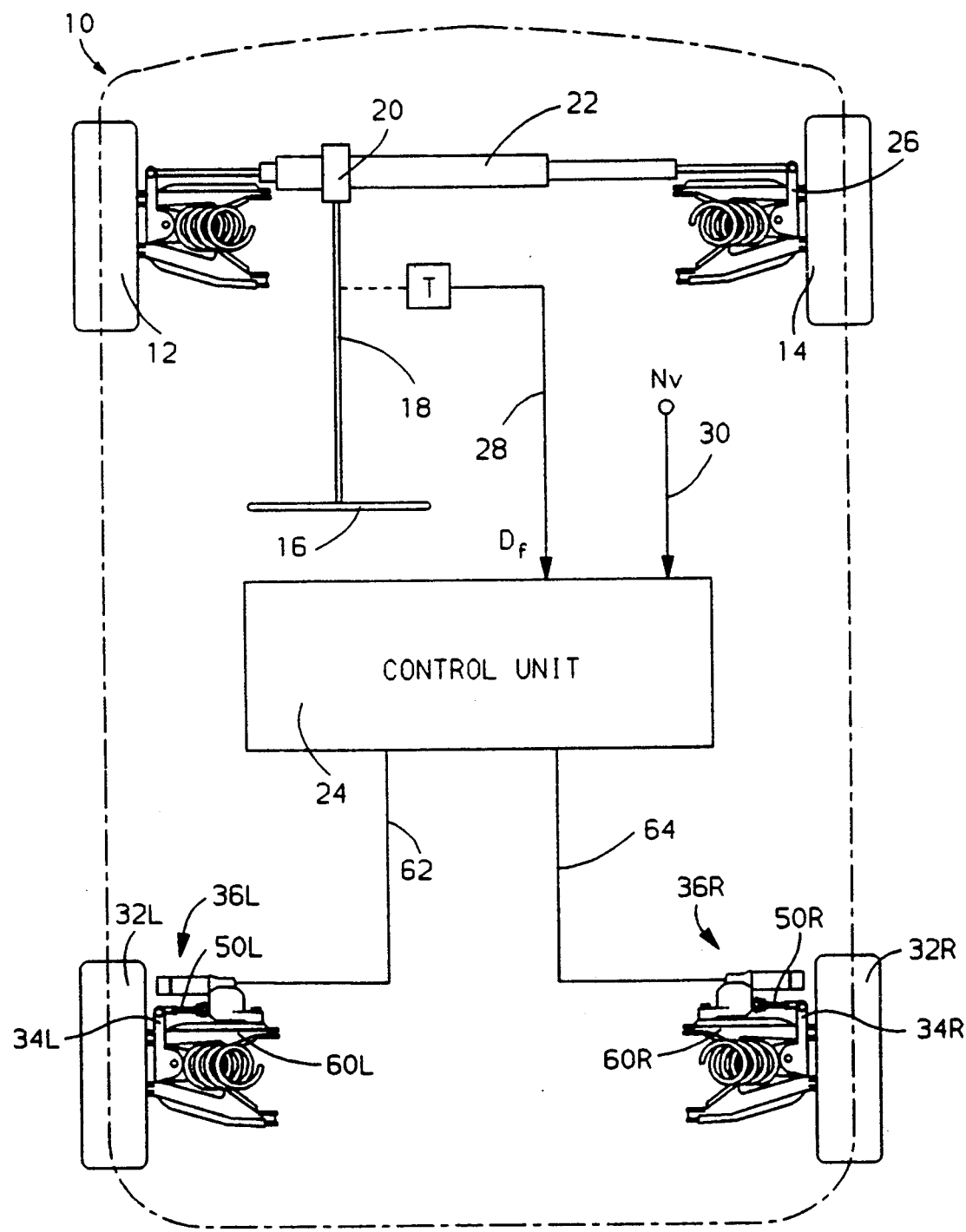
FIG. 1 is a schematic diagram of a vehicle steering system according to this invention, including a pair of independently controlled rear steering actuators and a computer-based control unit.

Referring particularly to FIG. 1, the reference numeral 10 generally designates a motor vehicle having four steerable wheels. The front wheels 12, 14 are steered together in response to rotation of a driver operated hand wheel 16. The hand wheel 16 is mechanically connected via steering column 18 to a pinion gear 20, which is maintained in meshing engagement with teeth formed on a front rack 22 which, in turn, is connected to front wheel tie rods (not shown).

A position transducer (T) responsive to the rotary position of steering column 18 provides a handwheel position signal as an input to a computer-based control unit 24 via line 28. For control purposes, the signal represents the steering angle Df of the front wheels as positioned by the vehicle operator via rotation of the hand wheel 16. The vehicle speed Nv is detected by a suitable speed pickup, possibly via an electronic engine control module, providing a vehicle speed signal Nv to control unit 24 via line 30.

The left (L) and right (R) rear wheels 32L, 32R are provided with steering knuckles 34L, 34R and linear electric actuators 36L, 36R for effecting limited independent toe-in steering. The actuators 36L, 36R are mounted on lower control arms 60L, 60R of the vehicle suspension, and are coupled to the steering knuckles 34L, 34R via output links 50L, 50R. The actuators 36L, 36R are controlled by control unit 24 via the conductor pairs 62, 64, respectively.

Figure 5A:
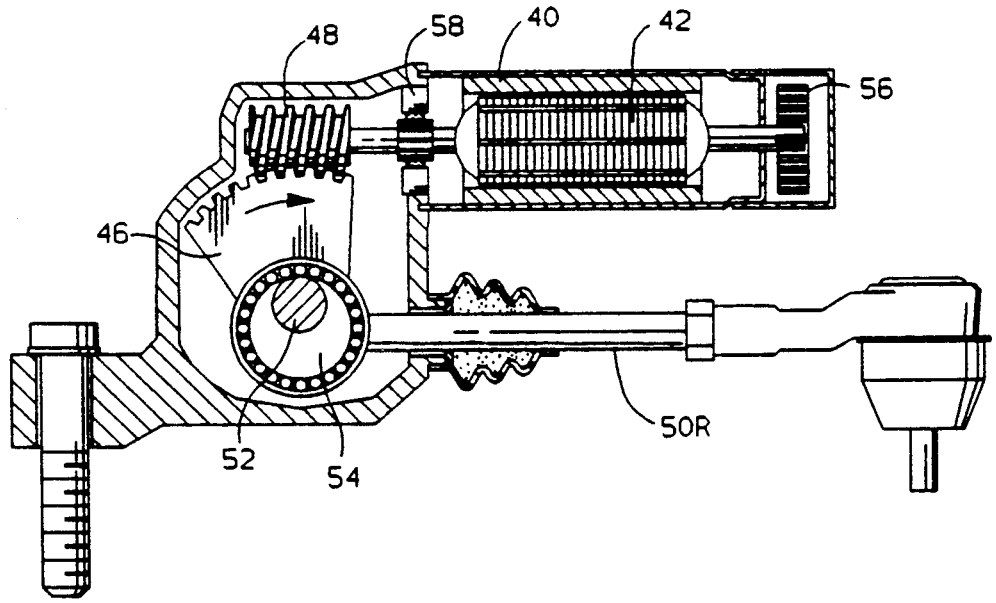
FIGS. 5a and 5b illustrate an actuator as shown in FIG. 1.

Referring to the partially sectioned view of right actuator 36R in FIG. 5a, it will be seen that each actuator 36L, 36R comprises an electric motor 40 having an armature 42 connected to drive a sector gear 46 via an integral worm gear 48, an axle pin 52 and eccentric journal 54 for connecting the sector gear 46 to the respective output link 50R, and a torsional spring 56 for biasing the motor armature 42 to a zero steering angle position.

Figure 5B:
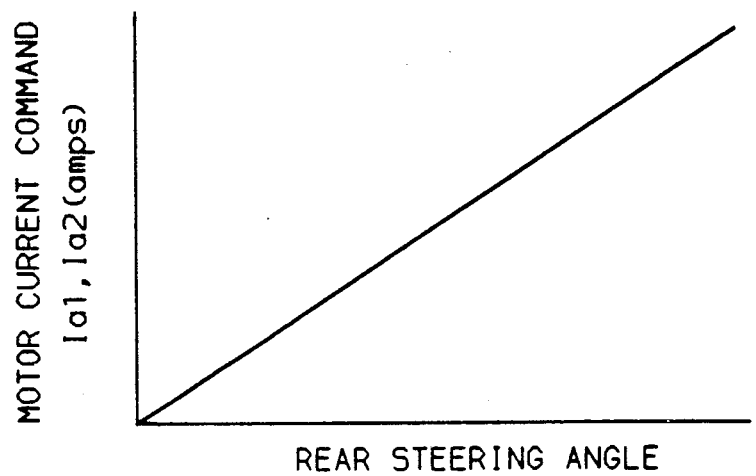

In the illustrated embodiment, motor 40 is mechanized with a permanent magnet DC machine, electric power being supplied to the rotor windings via a conventional commutator and brush assembly 58. The output links are positioned to effect a desired rear steering angle by energizing the motor 40 at a controlled current level. Motor output torque is developed in known relation to the motor current, and the output torque is opposed by the restoring or centering force of torsional spring 56. This results in a characteristic motor current vs. desired position relationship as depicted by the graph of FIG. 5b. This means that the control unit 24 can independently position the rear wheels 32L, 32R by scheduling suitable motor current values for the actuator motors 40L, 40R.

Figure 2A:
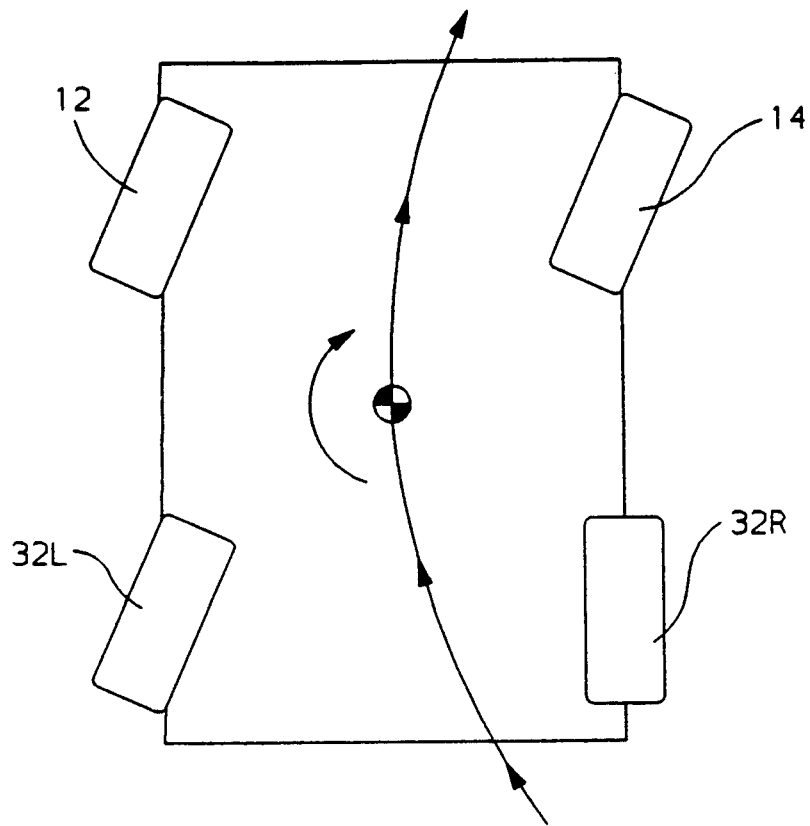
FIGS. 2a and 2b illustrate the outside wheel steering control of this invention.
Figure 2B:
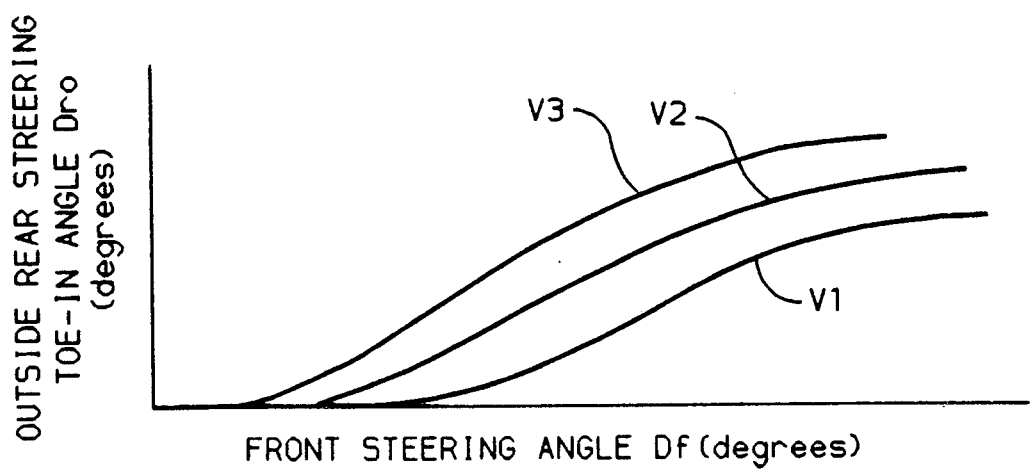

The primary control according to this invention is a variable toe-in of the rear wheel on the outside of the turn (outside wheel), as schematically depicted in FIG. 2a, the specific steering angle being determined as a function of the front wheel steering angle Df and vehicle speed Nv. The control is employed primarily at moderate-to-high vehicle speeds and off-center front steering angles, and has the effect of improving vehicle yaw stability in slippery road conditions and in severe steering maneuvers. FIG. 2b graphically depicts representative outside wheel steering commands Dro as a function of front steering angle Df for various increasing vehicle speeds V1, V2 and V3. As indicated by the graph, the outside rear steering angle Dro generally increases with both front steering angle Df and vehicle speed Nv.

At the initiation of a steering maneuver, the normal force is approximately equal on both left and right rear wheels. Thus, the initial in-phase steering of left rear wheel 32L produces a lateral force of moderate magnitude. However, as the body of the vehicle begins to roll about its longitudinal axis, the normal force on the left rear wheel 32L increases and the normal force on the right rear wheel decreases. This increases the lateral force produced by the left rear wheel 32L, thereby producing a progressive net increase in the rear cornering force which is in-phase with the front wheel cornering force. Since typical evasive maneuvers include both initiation and recovery phases, it will be understood, of course, that the right rear wheel 32R becomes the "inside wheel" during the unshown recovery phase of the example of FIG. 2a. In such a maneuver, the control of this invention operates to reduce the phase delay between the consequent front and rear wheel force reversals, thereby increasing yaw plane stability.

Figure 3A:
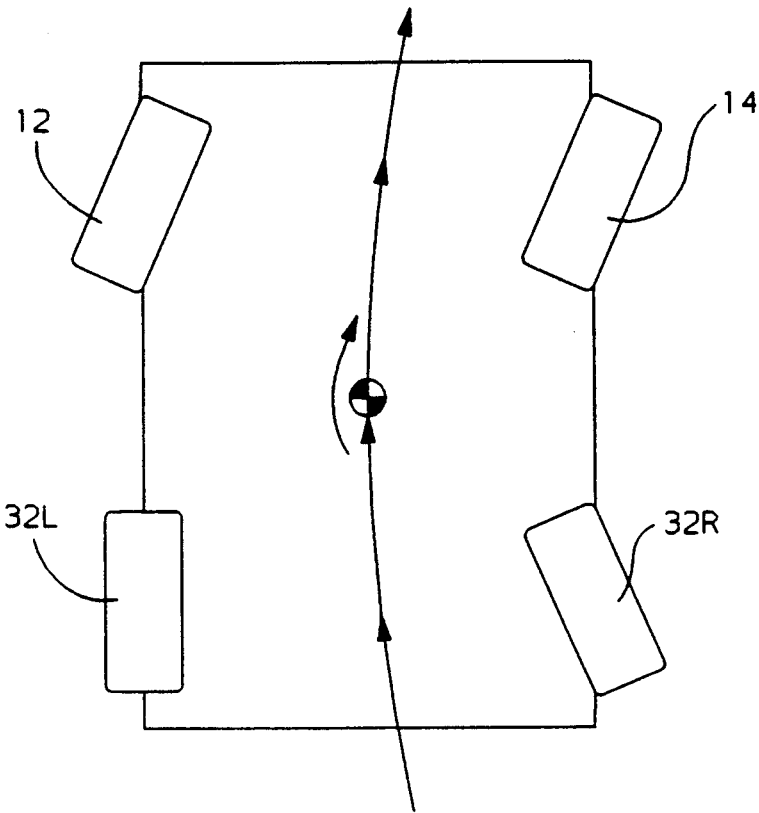
FIGS. 3a and 3b illustrate the inside wheel steering control of this invention.

The preferred embodiment of this invention also includes a secondary variable toe-in control of the rear wheel on the inside of the turn (inside wheel), as schematically depicted in FIG. 3a, the specific steering angle again being determined as a function of the front wheel steering angle Df and vehicle speed Nv. This control is employed primarily at moderate vehicle speeds near on-center front steering angles, and has the dual effect of improving on-center responsiveness and increasing yaw initiation at the beginning of a steering maneuver.

Figure 3B:
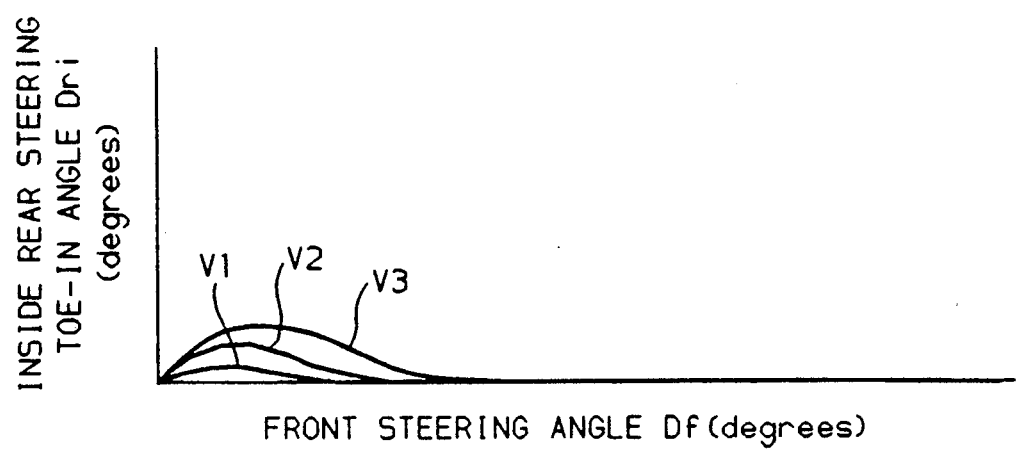

FIG. 3b graphically depicts representative inside wheel steering commands Dri as a function of front steering angle Df for various decreasing vehicle speeds V1, V2 and V3. As indicated by the graph, the inside rear steering angle Dri generally decreases with vehicle speed Nv; the angle Dri initially increases with increasing front wheel steering angle Df, but is progressively removed with further increasing front wheel steering angle Df. In some applications, it may be desirable to schedule the inside rear steering angle Dri as a function of the rate of change in front wheel steering angle (d(Df)/dt) instead of, or in addition to, front wheel steering angle Df and vehicle speed Nv.

Again, the normal force is approximately equal on both left and right rear wheels at the initiation of the steering maneuver, and the initial toe-in of right rear wheel 32R produces a lateral force of moderate magnitude. However, since the rear lateral force is now out-of-phase with the front wheels 12, 14, it tends to augment the on-center responsiveness of the vehicle when no significant steering maneuvers are intended. If the operator continues to increase the front wheel steering angle Df, as in a significant steering maneuver, the inside rear wheel steering angle Dri rapidly diminishes, as seen in the graph of FIG. 3b, but serves to initiate yawing of the vehicle for improved maneuverability and control. In significant steering maneuvers, there is also a natural reduction in the lateral force produced by the inside wheel toe-in as the body of the vehicle begins to roll about its longitudinal axis, reducing the normal force on the inside rear wheel 32R.

Figure 4:
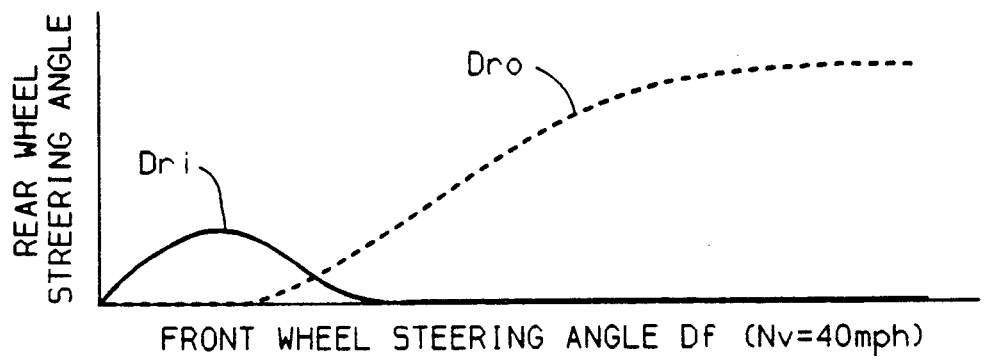
FIG. 4 graphically depicts inside and outside rear wheel steering commands developed according to this invention.

The graph of FIG. 4 overlays representative inner and outer rear wheel steering angle commands Dri, Dro as a function of front wheel steering angle Df for a given vehicle speed Nv of 40 MPH in a system incorporating both inside wheel and outside wheel controls. As indicated, the inside wheel control is generally dominant at relatively small front wheel steering angles where the normal force is substantially equalized, while the outside wheel control is generally dominant at moderate-to-relatively high steering angles.

Figure 6:
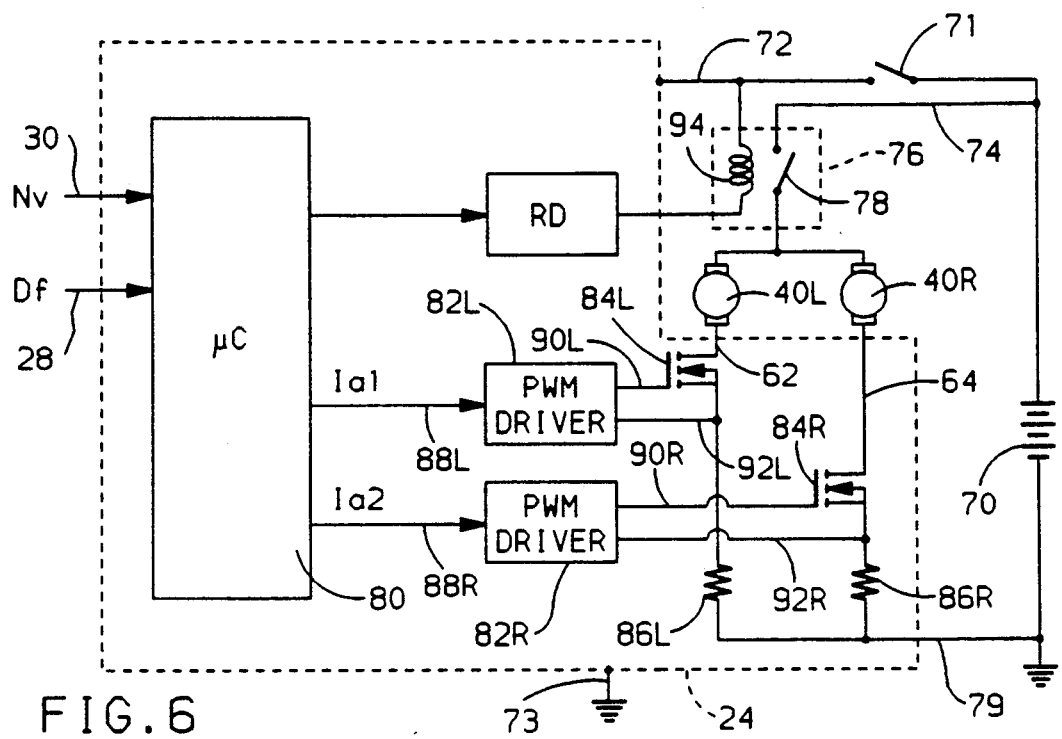
FIG. 6 is an electrical diagram of the system depicted in FIG. 1.
Figure 7:
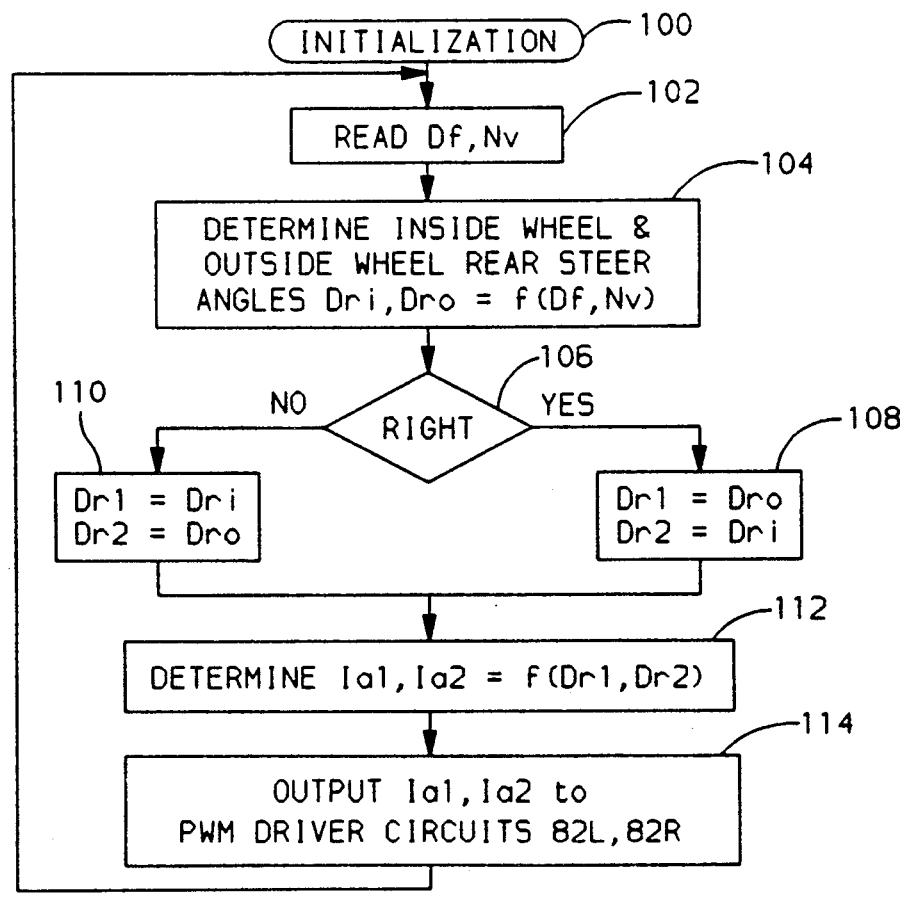
FIG. 7 is a flow diagram representative of computer program instructions executed by the computer-based control unit of FIG. 1 in carrying out the control of this invention.

FIGS. 6 and 7 illustrate the control of this invention from an electrical standpoint. FIG. 6 is a circuit diagram of the system of FIG. 1, including the computer-based control unit 24, and FIG. 7 depicts a flow diagram representative of computer program instructions executed by the control unit 24 in carrying out the control of this invention.

Referring to FIG. 6, the reference numerals used in previous figures are repeated where appropriate. Thus, the control unit 24 is connected to energize the actuator motors 40L and 40R via lines 62 and 64 in response to front steering angle and vehicle speed input signals Df, Nv on lines 28 and 30, respectively. Electrical power is supplied to the various components of control unit 24 by the vehicle storage battery 70 via ignition switch 71 and lines 72 and 73. The battery 70 is connected to motors 40L, 40R via line 74 and normally open switch arm 78 of relay 76; a motor current return path is provided by line 79.

The control unit 24 includes a microcomputer (uC) 80, left and right PWM Driver circuits 82L, 82R, left and right power FETs 84L, 84R, left and right resistive shunts 86L, 86R, and relay driver RD. The microcomputer, which may be a Motorola MC68HC11 Microcontroller or equivalent, develops and outputs left and right actuator current commands Ia1 and Ia2 to PWM Driver circuits 82L, 82R for effecting desired left and right rear steering angles Dr1 and Dr2. As indicated above, the motor current produces motor torque which opposes the centering torque of torsional spring 56, resulting in a current-related actuator position. The PWM Driver circuits, which may be Motorola TL494 PWM Control Circuits or equivalent, modulate the conduction of power FETs 84L and 84R via lines 90L and 90R to maintain the commanded actuator currents Ia1 and Ia2, respectively. Analog voltages indicative of the actual motor current levels are supplied as inputs to the PWM Driver Circuits 82L and 82R via lines 92L an 92R, respectively.

Microcomputer 80 also controls the energization of relay coil 94 via relay driver RD. The relay coil 94 is connected to the battery 70 at one end via ignition switch 71, and at the other end via relay driver RD. In normal operation of the vehicle, the microcomputer 80 controls the relay driver RD to energize relay coil 94, closing the switch arm 78 to establish a battery current path for motors 40L, 40R.

Referring to the flow diagram of FIG. 7, the block 100 is executed at the initiation of each period of vehicle operation to initialize the various steering parameters and memory registers. Thereafter, the blocks 102-114 are repeatedly executed, as indicated by the flow diagram lines. Other related functions not directly related to the present invention, such as diagnostic error checking and instrumentation updating, are also performed.

The blocks 102 and 104 are first executed to read the front steering angle and vehicle speed input signals Df and Nv, and to determine the desired inside and outside rear wheel steering angles Dri and Dro. As indicated above, with respect to the graphs of FIGS. 3b and 2b, the steering angles Dri and Dro are determined as a combined function of the front wheel steering angle Df and the vehicle speed Nv. To this end, data points defining the traces depicted in those graphs are stored in nonvolatile memory of microcomputer 80 in three-dimensional look-up table arrays.

If the front steering angle Df indicates that the vehicle is being steered to the right, as determined at block 106, the block 108 is executed to assign the outside wheel steering angle Dro to the left actuator control variable Dr1 and the inside wheel steering angle Dri to the right actuator control variable Dr2. If the vehicle is being steered to the left, the block 110 is executed to assign the outside wheel steering angle Dro to the right actuator control variable Dr2 and the inside wheel steering angle Dri to the left actuator control variable Dr1.

Blocks 112 and 114 are then executed to determine and output the left and right actuator current commands Ia1, Ia2 to PWM Driver Circuits 82L, 82R, completing the routine. As indicated above, in reference to the graph of FIG. 5b, the current commands Ia1 and Ia2 are determined as a function of the desired left and right steering angle commands Dr1 and Dr2, respectively.

To this end, data points defining the trace of FIG. 5b are stored in nonvolatile memory of microcomputer 80 in a two-dimensional look-up table array. Since the actuators 36L and 36R have essentially equivalent performance characteristics, the same tables are used for both.

While this invention has been described in reference to the illustrated embodiment, it will be understood that various modifications will occur to those skilled in the art, and that this invention is not limited thereto. For example, various supportive control loops, such as rear wheel position feedback controls, may be added. Steering systems incorporating such modifications may thus fall within the scope of this invention which is defined by the appended claims.

The embodiments of the invention in which an exclusive property or privilege is claimed are defined as follows:

1. In a motor vehicle having left and right front wheels which are steered at an angle determined in relation to the position of an operator manipulated handwheel, and left and right rear wheels which trail said left and right front wheels during forward motion of said vehicle, a rear wheel steering control system comprising:

left actuator means effective when activated for steering said left rear wheel in a toe-in direction;

right actuator means effective when activated for steering said right rear wheel in a toe-in direction; and control means for effecting independent activation of said left and right actuator means in response to operator manipulation of said handwheel, wherein said control means comprises inside wheel control means effective when said front wheel steering angle is within a range of relatively small steering angles to effect (1) activation of said left actuator means independent of said right actuator means if said front wheels are steered in a leftward direction, (2) activation of said right actuator means independent of said left actuator means if said front wheels are steered in a rightward direction, and outside wheel control means effective when said front wheel steering angle is within a range of relatively large steering angles to effect (1) activation of said right actuator means independent of said left actuator means if said front wheels are steered in a leftward direction, (2) activation of said left actuator means independent of said right actuator means if said front wheels are steered in a rightward direction.

2. The control system of claim 1, wherein:

said activation of said left and right actuator means by said inside wheel control means operates to individually steer said left and right rear wheels to a rear steering angle which depends upon a magnitude of such activation; and the activation of said left and right actuator means by said inside wheel control means is in accordance with a schedule of rear wheel steering angle vs. front wheel steering angle for which the scheduled rear wheel steering angle increases and then decreases with increasing front wheel steering angles within said range of relatively small steering angles.

3. The control system of claim 1 wherein:

said activation of said left and right actuator means by said outside wheel control means operates to individually steer said left and right rear wheels to a rear steering angle which depends upon a magnitude of such activation; and the activation of said left and right actuator means by said outside wheel control means is in accordance with a schedule of rear wheel steering angle vs. front wheel steering angle for which the scheduled rear wheel steering angle increases with increasing front wheel steering angles within said range of relatively large steering angles.

* * * * *